United States Patent
Park et al.

(10) Patent No.: US 8,778,296 B2
(45) Date of Patent: Jul. 15, 2014

(54) DISPERSIBLE CARBON NANOTUBE, CARBON NANOTUBE-POLYMER COMPOSITE AND METHOD OF MANUFACTURING THE CARBON NANOTUBE-POLYMER COMPOSITE

(75) Inventors: Jong-jin Park, Yongin-si (KR); Tae-gwan Park, Daejeon (KR); Yu-han Lee, Daejeon (KR); Kwang-hee Lee, Suwon-si (KR)

(73) Assignees: Samsung Electronics Co., Ltd. (KR); Korea Advanced Institute of Science and Technology (KR)

( * ) Notice: Subject to any disclaimer, the term of this patent is extended or adjusted under 35 U.S.C. 154(b) by 586 days.

(21) Appl. No.: 12/578,352

(22) Filed: Oct. 13, 2009

(65) Prior Publication Data

US 2010/0261821 A1    Oct. 14, 2010

(30) Foreign Application Priority Data

Apr. 14, 2009   (KR) .................. 10-2009-0032338

(51) Int. Cl.
*C01B 31/00* (2006.01)
(52) U.S. Cl.
USPC .............. 423/447.3; 423/447.1; 977/742
(58) Field of Classification Search
USPC ......... 423/447.1, 447.3, 445 B, DIG. 40, 460
See application file for complete search history.

(56) References Cited

U.S. PATENT DOCUMENTS

2008/0014471 A1    1/2008  Kim
2011/0204297 A1*   8/2011  Park et al. .............. 252/503

FOREIGN PATENT DOCUMENTS

KR    1020030091977 A    12/2003
KR    1020060090654 A    8/2006

OTHER PUBLICATIONS

Ke, P.; Qiao, R.; "Carbon nanomaterials in biological systems" J. Phys.: Condens. Matter 19 (2007) 373101 (25pp.).*
Yeong Don Park, Jung Ah Lim, Yunseok Jang, Minkyu Hwang, Hwa Sung Lee, Dae Ho Lee, Hwa-Jeong Lee, Jong-Beom Baek, Kilwon Cho, Enhancement of the field-effect mobility of poly(3-hexylthiophene)/functionalized carbon nanotube hybrid transistors, Organic Electronics, vol. 9, Issue 3, Jun. 2008, pp. 317-322, ISSN 1566-1199, 10.1016/j.orgel.2007.11.*
Multipurpose Organically Modified Carbon Nanotubes: From Functionalization to Nanotube Composites Vasilios Georgakilas, Athanasios Bourlinos, Dimitrios Gournis, Theodoros Tsoufis, Christos Trapalis, Aurelio Mateo-Alonso, and Maurizio Prato Journal of the American Chemical Society 2008 130 (27), 8733-8740.*
Fei et al., Coating carbon nanotubes by spontaneous oxidative polymerization of dopamine, Carbon, Vol. 46 (13): Nov. 2008, pp. 1795-1797.
J. Herbert Waite et al., "Assay of Dihydroxyphenylalanine (Dopa) in Invertebrate Structural Proteins", Oxidations, Hydroxylations, and Halogenations, 1998 [26] pp. 397-413.
M.W. Marshall et al., "Measurement of functionalised carbon nanotube carboxylic acid groupings using a simple chemical process", Carbon, (2006) vol. 44, pp. 1137-1141.

* cited by examiner

*Primary Examiner* — Daniel C McCracken
*Assistant Examiner* — Richard M Rump
(74) *Attorney, Agent, or Firm* — Cantor Colburn LLP

(57) ABSTRACT

A dispersible carbon nanotube ("CNT") comprising a CNT backbone and an organic moiety attached to the carbon nanotube backbone and comprising a hydroxyl substituted $C_6$ to $C_{14}$ aromatic group are described, as well as a CNT-polymer composite and a method of manufacturing the CNT-polymer composite.

19 Claims, No Drawings

DISPERSIBLE CARBON NANOTUBE, CARBON NANOTUBE-POLYMER COMPOSITE AND METHOD OF MANUFACTURING THE CARBON NANOTUBE-POLYMER COMPOSITE

CROSS-REFERENCE TO RELATED APPLICATION

This application claims priority to Korean Patent Application No. 10-2009-0032338, filed on Apr. 14, 2009, and all the benefits accruing therefrom under 35 U.S.C. §119, the content of which in its entirety is herein incorporated by reference.

BACKGROUND

1. Field

One or more embodiments relate to a dispersible carbon nanotube ("CNT"), a CNT-polymer composite including the dispersible CNT and a polymer and a method of manufacturing the CNT-polymer composite.

2. Description of the Related Art

Polymers are used in various applications such as electronic products, lifestyle goods and construction materials. Mechanical properties of polymers, such as impact resistance, rigidity, elasticity and tensile strength may be changed by selection of the molecular structure of monomers used for synthesizing the polymers, the molar ratio of the monomers and by selection of functional groups included in the monomers.

As such, the properties of the polymers may be selected by varying the type and content of the monomers used in the synthesis of the polymers. Moreover, the properties of the polymers may be further selected by adding additional components, such as fillers, to the polymers.

SUMMARY

One or more embodiments include a dispersible carbon nanotube ("CNT") having excellent dispersion characteristics.

One or more embodiments include a CNT-polymer composite having excellent mechanical properties.

One or more embodiments include a method of manufacturing the CNT-polymer composite.

Additional aspects, features and advantages will be set forth in part in the description which follows.

According to one or more embodiments disclosed is a dispersible carbon nanotube ("CNT") comprising a CNT backbone and an organic moiety attached to the carbon nanotube backbone and comprising a hydroxyl substituted $C_6$ to $C_{14}$ aromatic group.

According to one or more embodiments, disclosed is a CNT-polymer composite comprising: a dispersible CNT, and a polymer, wherein the dispersible CNT comprises a CNT backbone and an organic moiety attached to the carbon nanotube backbone and comprising a hydroxyl substituted $C_6$ to $C_{14}$ aromatic group.

According to one or more embodiments, also disclosed is a method of manufacturing a CNT-polymer composite, the method comprising: providing a dispersible CNT comprising a CNT backbone and an organic moiety attached to the carbon nanotube backbone and comprising a hydroxyl substituted $C_6$ to $C_{14}$ aromatic group; and mixing the dispersible CNT with a polymer.

DETAILED DESCRIPTION

The invention now will be described more fully hereinafter, in which various embodiments are disclosed. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A dispersible carbon nanotube ("CNT") according to an embodiment includes a CNT backbone and an organic moiety attached to the carbon nanotube backbone and including a hydroxyl substituted $C_6$ to $C_{14}$ aromatic group.

The dispersible CNT includes the organic moiety, which includes a hydroxyl substituted $C_6$ to $C_{14}$ aromatic group, and, while not wanting to be bound by theory, thus may be uniformly dispersed in a polymer without agglomeration or phase separation. In addition, due to the hydroxyl substituted $C_6$ to $C_{14}$ aromatic group, interfacial adhesion between the dispersible CNT and the polymer may be improved. Accordingly, a CNT-polymer composite having excellent mechanical properties (for example, elasticity and tensile modulus) may be obtained.

The hydroxyl substituted $C_6$ to $C_{14}$ aromatic group may be a hydroxyl substituted phenyl group, a hydroxyl substituted naphthyl group, or a hydroxyl substituted anthryl group. However, the hydroxyl substituted $C_6$ to $C_{14}$ aromatic group is not limited thereto.

The hydroxyl substituted $C_6$ to $C_{14}$ aromatic functional group includes one or more hydroxyl groups. That is, one or more hydrogen atoms of the $C_6$ to $C_{14}$ aromatic group is substituted with a hydroxyl group.

The hydroxyl substituted $C_6$ to $C_{14}$ aromatic group may be a catechol group. However, the hydroxyl substituted $C_6$ to $C_{14}$ aromatic group is not limited thereto.

Each organic moiety may be represented by Formula 1 below.

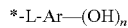

Formula 1

In Formula 1, * represents a point of attachment to the CNT backbone.

In Formula 1, L may be represented by $-(CR_1R_2)_a-$. In an embodiment, $R_1$ and $R_2$ may each be independently selected from the group consisting of hydrogen, a hydroxyl group, a cyano group, an halogen atom and $-NH_2$ and a may be about 1 to about 20. For example, $R_1$ and $R_2$ may independently be hydrogen or $-NH_2$. Also, a may be about 1 to about 10, specifically about 1 to about 5, more specifically about 2 to about 4. However, L is not limited thereto. L may optionally be a linking group selected from the group consisting of $-O-$, $-NR_3-$ and

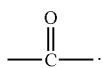

In an embodiment, $R_3$ may be hydrogen or a $C_1$ to $C_{10}$ alkyl group. For example, $R_3$ may be hydrogen, a methyl group, an ethyl group or a propyl group. However, $R_3$ is not limited thereto.

In Formula 1, Ar may be a $C_6$ to $C_{14}$ aromatic group. For example, Ar may be a phenyl group, a naphthyl group or an anthryl group. However, the Ar is not limited thereto.

In Formula 1, n denotes the number of positions in which a hydrogen atom in Ar may be substituted with a hydroxyl group and n may be about 1 to about 13, specifically about 2 to about 10, more specifically about 3 to about 8. For example, n may be about 1 to about 5. However, n is not limited thereto.

In Formula 1, L may be represented by Formula 2a, 2b, 2c or 2d below. However, L is not limited thereto.

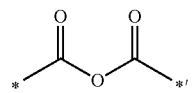

Formula 2a

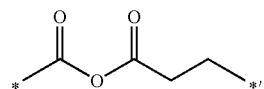

Formula 2b

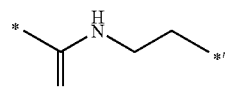

Formula 2c

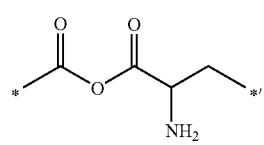

Formula 2d

In Formulas 2a, 2b, 2c and 2d, * represents a point of attachment to the CNT backbone and *' represents a point of attachment to Ar in Formula 1.

Each organic moiety independently may be, but is not limited to, a moiety represented by Formula 1a, 1b, 1c or 1d below.

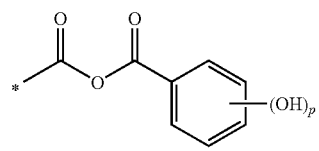

Formula 1a

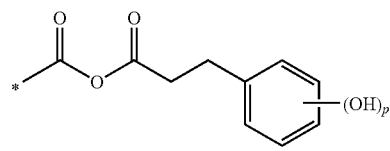

Formula 1b

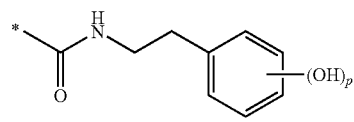

Formula 1c

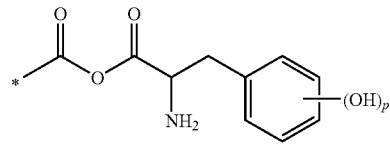

Formula 1d

In Formulas 1a, 1b, 1c and 1d, * represents a point of attachment to the CNT backbone, and p may be 1 to 5, specifically 2 to 4, more specifically 3.

The CNT backbone of the dispersible CNT may be any CNT having a well-known form and structure.

The term "CNT backbone" as used herein denotes an allotrope of carbon having a cylindrical structure. Bonded to the CNT backbone is an organic moiety, which includes the hydroxyl substituted $C_6$ to $C_{14}$ aromatic group.

The CNT backbone may be a single-walled CNT, a double-walled CNT, a multi-walled CNT, a rope CNT or a combination thereof. However, the CNT backbone is not limited thereto and may be a combination of at least two of the foregoing.

The CNT backbone may be a CNT that is currently commercially available. The CNT backbone may also be a CNT that is currently commercially available and additionally dried and/or refined.

The dispersible CNT may have a high aspect ratio. Also, the dispersible CNT may have excellent dispersion and adhesion characteristics due to the organic moiety attached to the carbon nanotube backbone and which includes the hydroxyl substituted $C_6$ to $C_{14}$ aromatic group therein. Thus a plurality of the dispersible CNTs may be uniformly dispersed in the polymer and have excellent adhesion at the interface with the polymer after being dispersed.

A CNT-polymer composite includes the dispersible CNT and a polymer. The dispersible CNT is as disclosed above.

The polymer may be any well-known polymer. For example, the polymer may be a polymer having improved mechanical properties, such as elasticity and tensile modulus, after being mixed with the dispersible CNT. The polymer may have various properties, for example, electrical conductivity and elasticity.

The polymer may include various functional polymers. Examples of the functional polymer may include a heat resistant polymer such as polyphenylene sulfide, a polysulfone, polybenzimidazole, polyphosphazene or polythiazyl; a conductive polymer such as polythiophene, polyacetylene, polypyrrole, polyphenylene, polythienyl vinyldene, polyphenylene sulfide, polyaniline, polyparaphenylene vinylene, polyparaphenylene, polyfluorene or polythiophene vinylene; a piezoelectric polymer such as poly vinylidene fluoride; a photosensitive polymer such as polyvinyl cinnamate or an acryl-based polymer; and combination thereof. However, the polymer is not limited thereto and may include a combination of at least two of the foregoing.

Alternatively, the polymer may include, but is not limited to, a polyolefin-based polymer, an acryl-based polymer, a polyurethane-based polymer, an ether-based polymer, a polyester-based polymer, a polyamide-based polymer, a formaldehyde-based polymer, a silicon-based polymer and a copolymer comprising one or more monomers of these polymers. Examples of the polymer may also include combinations of at least two of the foregoing. In this regard, examples of the polymer may include polyethylene ("PE"), polyvinyl fluoride ("PVF"), polyvinyl chloride ("PVC"), polyvinylidene fluoride ("PVDF"), polyvinylidene chloride ("PVDC"), polychlorotrifluoroethylene ("PCTFE"), polytetrafluoroethylene ("PTFE"), polypropylene ("PP"), poly(1-butene), poly(4-methylpentene), polystyrene, polyvinyl pyridine, polybutadiene, polyisoprene, polychloroprene, styrene-acrylonitrile copolymer, acrylonitrile-butadiene-styrene terpolymer, ethylene-methacrylic acid copolymer, styrene-butadiene rubber, nitrile rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resins, polyphenylene oxide, polyethylene terephthalate, polybutylene terephthalate, polydihydroxymethylcyclohexyl terephthalate, cellulose esters, polycarbonate, polyamide and polyimide, but the polymer is not limited thereto. Some of the polymers listed above may have desirable properties, including heat resistance, electrical conductivity and piezoelectricity.

The dispersible CNT may be physically mixed with the polymer. Also, some of the organic moieties of the plurality of dispersible CNTs may be chemically mixed with some of the functional groups of the polymer. Accordingly, the term CNT-polymer composite denotes not only a physical mixture of the dispersible CNT and the polymer but also a chemical mixture wherein some of the organic moieties of the dispersible CNTs are exchanged with some of the functional groups of the polymer.

The CNT-polymer composite may further include an acid-treated CNT.

The acid-treated CNT may be an intermediate used in manufacturing the dispersible CNT. For example, the acid-treated CNT may include at least one carboxyl group on the surface thereof. However, the acid-treated CNT is not limited thereto.

The CNT-polymer composite may comprise a non-treated CNT.

The term "non-treated CNT" used herein denotes a CNT, which does not include an organic moiety including the hydroxyl substituted $C_6$ to $C_{14}$ aromatic group and on which an acid treatment process has not been performed. The non-treated CNT may be a CNT that is currently commercially available and may be overlapped with a portion of the CNT backbone.

An acid-treated CNT and/or a non-treated CNT may be included during the manufacturing of the CNT-polymer composite. Alternatively, an amount of the acid-treated CNT and/or the non-treated CNT may be added to the CNT-polymer composite, and while not wanting to be bound by theory, it is believed that such addition may improve various mechanical properties of the CNT-polymer composite.

The CNT-polymer composite may further include a metal nanoparticle. The metal nanoparticle may provide electrical conductivity to the CNT-polymer composite.

In this regard, any electrically conductive metal nanoparticle may be used as the metal nanoparticle. For example, the metal nanoparticle may include at least one element selected from the group consisting of Cs, Mg, Ca, Sr, Sc, Ti, Zr, Nb, Ta, Cr, Mo, W, Mn, Fe, Ru, Co, Ir, Ni, Pd, Pt, Cu, Ag, Au, Zn, Cd, Al, Ga, In, Ti, Si, Ge, Sn, Pb, Sb and Te.

The average diameter of a plurality of the metal nanoparticles may be about 1 nanometer to about 100 nm, specifically about 2 nm to about 7 nm, more specifically, about 3 nm to about 5 nm. When the average diameter of the plurality of the metal nanoparticles is as described above, the metal nanoparticles may be uniformly dispersed in the CNT-polymer composite. However, the average diameter of the metal nanoparticles is not limited to the range above.

The amount of the metal nanoparticle may be appropriately selected by one of ordinary skill in the art in consideration of the use of the CNT-polymer composite. For example, the amount of the metal nanoparticle may be about 0.001 part by weight to about 20 parts by weight, specifically about 0.01 part by weight to about 10 parts by weight, more specifically about 0.1 part by weight to about 1 part by weight based on 100 parts by weight of the CNT-polymer composite. However, the amount of the metal nanoparticle is not limited thereto.

The CNT-polymer composite may further include an additive. Examples of the additive may include a solvent, a coupling agent, a dye, a filler, a flame retardant, a wetting agent, or the like, or a combination thereof. However, the additive is not limited thereto and one or more additional ingredients may be simultaneously used.

The solvent may be included in the polymer used in the CNT-polymer composite. Also, the solvent may be added to the CNT-polymer composite, for example in order to improve dispersion or miscibility of the dispersible CNT in the CNT-polymer composite or to facilitate formation of a film by controlling viscosity and flow of the CNT-polymer composite.

Examples of the solvent may include, but are not limited to, dimethylformamide ("DMF"), 4-hydroxy-4-methyl-2-pentanone, ethylene glycol monoethyl ether, 2-methoxymethanol, methoxy propyl acetate, ethyl-3-ethoxypropionate, cyclohexanone and combinations thereof. In this regard, the solvent may include two or more of the foregoing.

The amount of the solvent may be appropriately selected by one of ordinary skill in the art without undue experimentation in consideration of the use of the CNT-polymer composite. For example, the amount of the solvent may be about 0.1 part by weight to about 98 parts by weight, specifically about 1 part by weight to about 90 parts by weight, more specifically about 10 parts by weight to about 80 parts by weight based on 100 parts by weight of the CNT-polymer composite. However, the amount of the solvent is not limited thereto.

The coupling agent may be used to provide toughness to the CNT-polymer composite. Examples of the coupling agent may include, but are not limited to, aminopropyltriethoxysilane, phenylaminopropylmethoxysilane, ureidopropyltriethoxysilane, glycidoxypropyltrimethoxysilane, isocyanatopropyltriethoxysilane, isopropyltriisostearoyltitanate, acetoalkoxyaluminurn di isopropoxide and combinations thereof. In this regard, the coupling agent may include two or more of the foregoing, which may be simultaneously used.

The dye may be used to provide a color to the CNT-polymer composite. The dye may be any well-known dye for obtaining a desired color. For example, a dye for obtaining the three primary colors of red, green and blue, or a dye for obtaining a complementary color of a secondary color may be used. For example, a red color layer, a green color layer and a blue color layer may be respectively disposed so as to comprise an azo-based dye, a phthalocyanine based dye and an anthraquinone dye. However, the dye is not limited thereto.

The filler may be a well-known material and may be used for enhancing mechanical properties of the CNT-polymer composite. For example, the filler may include at least one material selected from the group consisting of a glass, beads, carbon black, graphite and the like and a combination thereof. However, the filler is not limited thereto.

The flame retardant may be a well-known material and may be used for providing flame retardancy to the CNT-polymer composite. For example, the flame retardant may be an inorganic flame retardant such as $Mg(OH)_2$, $Al(OH)_3$, or the like, or a combination thereof. However, the flame retardant is not limited thereto.

The wetting agent may be a well-known material and may improve a wettability of the CNT-polymer composite. Examples of the wetting agent may include glycerine, a sorbitol solution, propylene glycol, polyethylene glycol, an amorphous sorbitol solution or the like, or a combination thereof. However, the wetting agent is not limited thereto.

The amount of the additive may be appropriately selected by one of ordinary skill in the art without undue experimentation in consideration of the use of the CNT-polymer composite.

The CNT-polymer composite may be processed, for example, to form a film, sheet, pellet, pattern or the like, and may be used in various products such as an electronic product, a lifestyle good, a household appliance, a toy, a car part, a construction material or the like. For example, the CNT-polymer composite may be used in an electronic product, such as, for example, a housing of an electronic device, an antistatic adhesive sheet, an electromagnetic shielding film, an organic light emitting diode ("OLED"), a plasma display, an electron emitter, a thin film transistor, a photovoltaic device, an integrated circuit, a pressure sensor, a chemical sensor, a biosensor, a solar cell, a lighting device, a washing machine, a vacuum cleaner, a refrigerator, an air conditioner, a dish washer, a dish dryer, an electrical connector, an air cleaner, a rice cooker, a telephone, a mobile phone, a computer, an electric shaver, a laptop, a television, a piece of audio equipment, a digital versatile disk ("DVD"), a speaker, a humidifier, a microwave or the like. The lifestyle good may be a toothbrush, a hair curling iron, a shoe insole or an accessory. The household good may be a bidet or a water purifier. The toy may be a model car or a model airplane. A car part may be a steering wheel, a handle or an interior material. A construction material may be a flooring material, wallpaper, a tile or a coating material. However, the present embodiment is not limited thereto and the CNT-polymer composite may be used in any application in which a plastic is used.

A method of manufacturing a CNT-polymer composite according to an embodiment may include: providing a dispersible CNT comprising a CNT backbone and an organic moiety comprising a hydroxyl substituted $C_6$ to $C_{14}$ aromatic group; and mixing the dispersible CNT with a polymer to obtain the CNT-polymer composite. In an embodiment, the dispersible CNT comprising a CNT backbone and an organic moiety attached to the carbon nanotube backbone and comprising a hydroxyl substituted $C_6$ to $C_{14}$ aromatic group may be provided by contacting the organic moiety including a hydroxyl substituted $C_6$ to $C_{14}$ aromatic group to the CNT backbone.

The providing of the dispersible CNT may include acid-treating a non-treated CNT and mixing the acid-treated CNT with the compound represented by Formula 3:

$$Q_1\text{-L-Ar}-(OH)_n \quad \quad \text{Formula 3}$$

In Formula 3, L, Ar and n are as described above.

In Formula 3, $Q_1$ may be hydrogen or a halogen atom. However, $Q_1$ is not limited thereto.

The acid-treating of the non-treated CNT may be performed by contacting the non-treated CNT with at least one acid selected from the group consisting of nitric acid, hydrochloric acid, sulphuric acid and the like and a combination thereof. The temperature and time for contacting the non-treated CNT with the acid may vary according to the concentration of the acid and may be determined by one skilled in the art without undue experimentation.

The compound represented by Formula 3 may be mixed with a compound comprising an acid group (for example, a carboxylic acid group) attached to the surface of the acid-treated CNT and may provide the organic moiety including the hydroxyl substituted $C_6$ to $C_{14}$ aromatic functional group.

The compound represented by Formula 3 may also be represented by Formula 3a, 3b, 3c or 3d below. However, the compound represented by Formula 3 is not limited thereto.

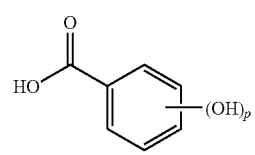

Formula 3a

-continued

Formula 3b

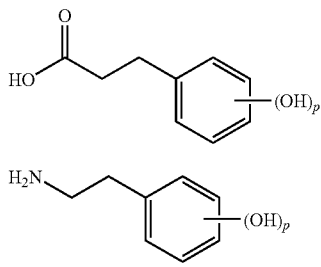

Formula 3c

Formula 3d

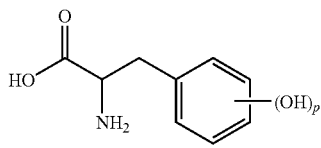

In Formulas 3a, 3b, 3c and 3d, p is 1 to 5, specifically 2 to 4, more specifically 3.

The mixing of the dispersible CNT with the polymer, and thereby obtaining the CNT-polymer composite, may be performed by using any well-known method of mixing, as can be determined by one skilled in the art without undue experimentation. For example the mixing may include polymerizing in-situ a mixture obtained by mixing monomers for synthesizing the polymer to be mixed with the dispersible CNT with the dispersible CNT, mixing a solution obtained by dissolving the polymer in a solvent with the dispersible CNT or mixing the polymer with the dispersible CNT while melting the polymer at high shear. However, the mixing method is not limited thereto.

In order to manufacture the CNT-polymer composite in various forms, for example as a sheet, a pellet, a film or a housing pattern of an electronic product, extrusion, molding or reactive injection molding ("RIM") may be used. For example, extrusion may be used for manufacturing the CNT-polymer composite as a pellet, that is, by using an extruder, and molding may be used for manufacturing the CNT-polymer composite in various forms, that is, by using a mold. Furthermore, before extrusion or molding is performed, a mixer or an ultrasonic process may be used in the mixing of the dispersible CNT and the polymer.

The mixing of the dispersible CNT and the polymer may be performed under various mixing conditions according to the selected mixing method. In this regard, the mixing may be performed at a temperature of about 200° C. to about 400° C., specifically about 250° C. to about 350° C., more specifically about 300° C. for about 10 minutes to about 24 hours, specifically about 1 hour to about 10 hours, more specifically about 2 hours to about 9 hours. However, in consideration of the polymer used and the mixing method, one of ordinary skill in the art may select appropriate the mixing conditions regardless of the range above without undue experimentation.

In an embodiment, a curing process may be further included, if desired.

Embodiments will now be described with reference to the examples described below. However, these examples are provided for illustrative purposes only and are not intended to limit the scope of the embodiments.

EXAMPLES

Manufacturing Example 1

Refinement of CNT

A 100 milligram (mg) amount of CNT (ASP-100, Iljin CNT, Korea) was refluxed in a 500 milliliter (ml) flask equipped with a reflux tube at 100° C. for 12 hours using 50 ml of distilled water. The refluxed material was filtered through a filter and was dried at 60° C. for 12 hours and residual fullerene was washed out using toluene. Remaining soot material was collected from the flask and was heated in a furnace at 470° C. for 20 minutes. Then, the heated soot material was washed out using 6 molar (M) hydrochloric acid and all metallic components were removed, thereby obtaining pure CNT.

Manufacturing Example 2

Inclusion of a Carboxyl Group on the Surface of CNT (Acid-Treatment of CNTs)

The pure CNT obtained in Manufacturing Example 1 was refluxed in a sonicator including an acid mixture of nitric acid and sulphuric acid mixed in the ratio of 7:3 volume:volume (v/v) for 24 hours. After the acid mixture was filtered using a 0.2 micrometer (μm) polycarbonate filter, the filtered material was immersed again in the nitric acid and was refluxed at 90° C. for 45 hours. Then, a supernatant obtained by centrifugal separation at 12,000 rpm was filtered using a 0.1 μm polycarbonate filter and the filtered material was dried at 60° C. for 12 hours. The dried CNT was dispersed in dimethylformamide ("DMF") and then was filtered using the 0.1 μm polycarbonate filter. The filtered CNT was used as disclosed below.

Manufacturing Example 3

Inclusion of a Dopamine Group on the Surface of Acid-Treated CNT (Manufacturing of Dispersible CNT)

The CNT obtained in Manufacturing Example 2 was added to a solvent mixture of phosphate buffered saline ("PBS") and acetone mixed in the ratio of 1:1 to have a concentration of 0.5 milligrams per milliliter (mg/ml) and then 1 M of hydrogen chloride (HCl) was used to adjust the acidity of the mixture to a pH of 5.5. Here, 147.5 mg of 1-ethyl-3-(dimethylaminopropyl)carbodiimide hydrochloride and 145.9 mg of dopamine hydrochloride were added to the mixture and mixed for about 4 hours. After completing the mixing, the resulting CNT was separated from the mixture using a 0.2 μm polycarbonate filter and then was dried, thereby obtaining a composite having a yield of 90 percent (%).

Example 1

Forming of CNT-Polymer Composite (1)

A 0.5 g amount of the dispersible CNT obtained in Manufacturing Example 3 was mixed with 99.5 g of polycarbonate (Teijin Chemical LTD, L-1250L, weight average molecular weight (Mw): 25,000 Daltons) as a polymer. The mixture was stirred using a mixer for 1 hour and extrusion was performed at 270° C. using a twin extruder (Bau Technology, Model L40/D11), thereby obtaining an extruded wire. Then, the extruded wire was cut using a pelletizer, thereby obtaining a CNT-polymer composite in a pellet form.

Example 2

Forming of CNT-Polymer Composite (2)

A CNT-polymer composite in a pellet form was manufactured in the same manner as in Example 1, except that 1 g of the dispersible CNT obtained in Manufacturing Example 3 was mixed with 99 g of polycarbonate (Teijin Chemical LTD, L-1250L, Mw: 25,000 Daltons) as a polymer.

Example 3

Forming of CNT-Polymer Composite (3)

A CNT-polymer composite in a pellet form was manufactured in the same manner as in Example 1, except that 1.5 g of the dispersible CNT obtained in Manufacturing Example 3 were mixed with 98.5 g of polycarbonate (Teijin Chemical LTD, L-1250L, Mw: 25,000 Daltons) as a polymer.

Comparative Example 1

Forming of a Polycarbonate Polymer Pellet

A polycarbonate pellet was manufactured in the same manner as in Example 1, except that 100 g of polycarbonate (Teijin Chemical LTD, L-1250L, Mw: 25,000 Daltons) was used without any dispersible CNT.

Comparative Example 2

Forming of CNT-Polymer Composite

A CNT-polymer composite in a pellet form was manufactured as in the same manner as in Example 1, except that 1 g of non-treated CNT (SWNT, ASP-100, Iljin CNT, Korea), instead of the dispersible CNT obtained in Manufacturing Example 3, was mixed with 99 g of polycarbonate (Teijin Chemical LTD, L-1250L, Mw: 25,000 Daltons) as a polymer.

Comparative Example 3

Forming of CNT-Polymer Composite

A CNT-polymer composite in a pellet form was manufactured in the same manner as in Example 1, except that 2 g of non-treated CNT (SWNT, ASP-100, Iljin CNT, Korea), instead of the dispersible CNT obtained in Manufacturing Example 3, was mixed with 98 g of polycarbonate (Teijin Chemical LTD, L-1250L, Mw: 25,000 Daltons) as a polymer.

Comparative Example 4

Forming of CNT-Polymer Composite

A CNT-polymer composite in a pellet form was manufactured in the same manner as in Example 1, except that 3 g of non-treated CNT (SWNT, ASP-100, Iljin CNT, Korea), instead of the dispersible CNT obtained in Manufacturing Example 3, was mixed with 97 g of polycarbonate (Teijin Chemical LTD, L-1250L, Mw: 25,000 Daltons) as a polymer.

Evaluative Example

The elastic modulus and tensile strength of the pellets obtained in Examples 1 through 3 and Comparative Examples 1 through 4 were measured and the results are shown in Table 1 below. The elastic modulus and tensile strength were measured according to ASTM D882-97 using an AGS-100G instrument manufactured by SHIMADZU LTD, as a measuring tool.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Weight of polycarbonate (wt %) | 99.5 | 99 | 98.5 | 100 | 99 | 98 | 97 |
| Dispersible CNT obtained in Manufacturing Example 3 (wt %) | 0.5 | 1 | 1.5 | 0 | 0 | 0 | 0 |
| Non-treated CNT (wt %) | 0 | 0 | 0 | 0 | 1 | 2 | 3 |
| Elastic modulus (MPa) | 4300 | 4700 | 4900 | 3500 | 4100 | 4500 | 4700 |
| Tensile strength (MPa) | 43 | 45 | 49 | 31 | 39 | 41 | 43 |

According to Table 1, the pellets including the dispersible CNT of Examples 1 through 3 have higher elastic modulus and tensile strength than the pellets in Comparative Examples 1 through 4.

As described above, according to the one or more of the above embodiments, a dispersible CNT having excellent dispersion characteristics and a CNT-polymer composite comprising the dispersible CNT and having excellent mechanical properties, such as elasticity and tensile modulus, may be provided. The CNT-polymer composite may be used in various applications such as in an electronic product, a lifestyle good or in a construction material.

It should be understood that the exemplary embodiments described herein should be considered in a descriptive sense only and not for purposes of limitation. Descriptions of features, advantages or aspects or each embodiment should be considered as available for other similar features or aspects in other embodiments.

What is claimed is:

1. A dispersible carbon nanotube comprising a carbon nanotube backbone and an organic moiety covalently bonded to the carbon nanotube backbone, wherein the organic moiety is represented by Formula 1:

   Formula 1 wherein
* represents a point of attachment to the carbon nanotube backbone,
wherein each L is independently selected from the group consisting of $-(CR_1R_2)_a-$, $-O-$, $-NR_3-$, and

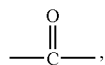

with the proviso that

if present is bonded to another L selected from the group consisting of $-O-$, $-NH-$, and $-(CR_4R_5)_a-$; and
wherein Ar is a $C_6$ to $C_{14}$ aromatic group; n is 1 to 13; a is 1 to 20; $R_1$ and $R_2$ are each independently selected from the group consisting of hydrogen, a hydroxyl group, a cyano group, a halogen atom, and $-NH_2$; $R_3$ is hydrogen or a $C_1$ to $C_{10}$ alkyl group; $R_4$ is $-H$ or $-NH_2$; and $R_5$ is $-H$.

2. The dispersible carbon nanotube of claim 1, wherein the hydroxyl substituted $C_6$ to $C_{14}$ aromatic group is a catechol group.

3. The dispersible carbon nanotube of claim 1, wherein L is represented by Formulas 2a, 2b, 2c or 2d:

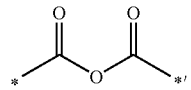   Formula 2a

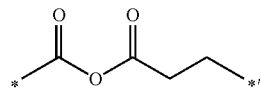   Formula 2b

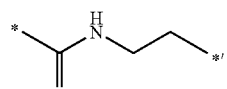   Formula 2c

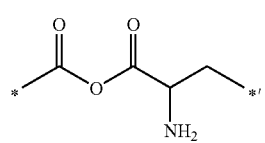   Formula 2d wherein * represents a point of attachment to the carbon nanotube backbone and *' represents a point of attachment to Ar in Formula 1.

4. The dispersible carbon nanotube of claim 1, wherein each organic moiety is independently represented by Formula 1a, 1b, 1c or 1d:

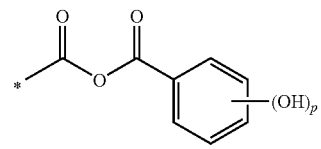   Formula 1a

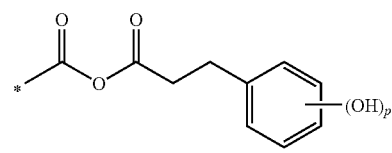   Formula 1b

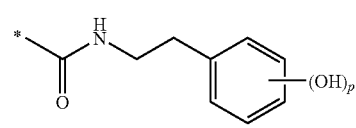   Formula 1c

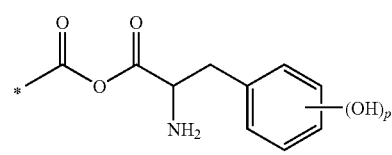   Formula 1d wherein * represents a point of attachment to the carbon nanotube backbone and p is 1 to 5.

5. The dispersible carbon nanotube of claim 1, wherein the organic moiety is represented by Formula 1:

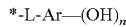   Formula 1 wherein
* represents a point of attachment to the carbon nanotube backbone,
wherein each L is independently selected from the group consisting of $-(CR_1R_2)_a-$, $-O-$, $-NR_3-$, and

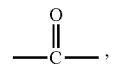

with the proviso that

if present is bonded to another L selected from the group consisting of $-O-$ and $-NH-$; and
wherein Ar is a $C_6$ to $C_{14}$ aromatic group; n is 1 to 13; a is 1 to 20; $R_1$ and $R_2$ are each independently selected from the group consisting of hydrogen, a hydroxyl group, a cyano group, a halogen atom, and $-NH_2$; and $R_3$ is hydrogen or a $C_1$ to $C_{10}$ alkyl group.

6. The dispersible carbon nanotube of claim 5, wherein the organic moiety is represented by Formula 1:

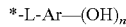   Formula 1 wherein
* represents a point of attachment to the carbon nanotube backbone;
wherein each L is independently selected from the group consisting of $-(CR_1R_2)_a-$, $-O-$, and $-NR_3-$,
wherein Ar is a $C_6$ to $C_{14}$ aromatic group; n is 1 to 13; a is 1 to 20; $R_1$ and $R_2$ are each independently selected from the group consisting of hydrogen, a hydroxyl group, a cyano group, a halogen atom, and —NH$_2$; and
R$_3$ is hydrogen or a C$_1$ to C$_{10}$ alkyl group.

7. A carbon nanotube-polymer composite comprising:
a dispersible carbon nanotube; and
a polymer, wherein the dispersible carbon nanotube comprises a carbon nanotube backbone and an organic moiety covalently bonded to the carbon nanotube backbone, wherein the organic moiety is represented by Formula 1:

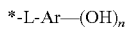   Formula 1 wherein
* represents a point of attachment to the carbon nanotube backbone,
wherein each L is independently selected from the group consisting of —(CR$_1$R$_2$)$_a$—, —O—, —NR$_3$—, and

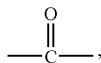

with the proviso that

if present is bonded to another L selected from the group consisting of —O—, —NH—, and —(CR$_4$R$_5$)$_a$—; and
wherein Ar is a C$_6$ to C$_{14}$ aromatic group; n is 1 to 13; a is 1 to 20;
R$_1$ and R$_2$ are each independently selected from the group consisting of hydrogen, a hydroxyl group, a cyano group, a halogen atom and —NH$_2$; R$_3$ is hydrogen or a C$_1$ to C$_{10}$ alkyl group; R$_4$ is —H or —NH$_2$; and R$_5$ is —H.

8. The dispersible carbon nanotube-polymer composite of claim 7, wherein the hydroxyl substituted C$_6$ to C$_{14}$ aromatic group is a catechol group.

9. The carbon nanotube-polymer composite of claim 7, wherein L is represented by Formula 2a, 2b, 2c or 2d:

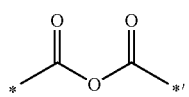   Formula 2a

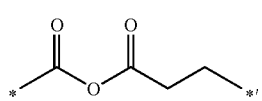   Formula 2b

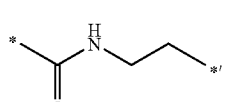   Formula 2c

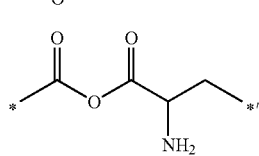   Formula 2d wherein * represents a point of attachment to the CNT backbone and *' represents a point of attachment to Ar in Formula 1.

10. The carbon nanotube-polymer composite of claim 7, wherein each organic moiety is independently represented by Formula 1a, 1b, 1c or 1d:

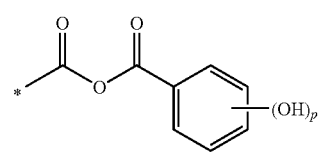   Formula 1a

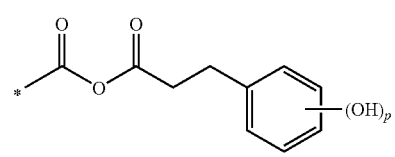   Formula 1b

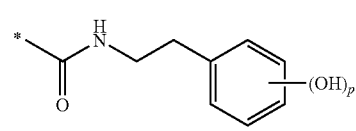   Formula 1c

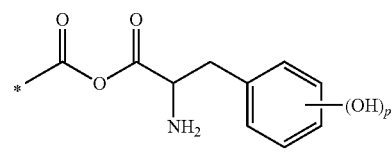   Formula 1d wherein * represents a point of attachment to the carbon nanotube backbone and p is 1 to 5.

11. The carbon nanotube-polymer composite of claim 7, wherein the carbon nanotube backbone comprises at least one nanotube selected from the group consisting of a single-walled carbon nanotube, a double-walled carbon nanotube, a multi-walled carbon nanotube a rope carbon nanotube and a combination thereof.

12. The carbon nanotube-polymer composite of claim 7, wherein the polymer comprises at least one polymer selected from the group consisting of a polyolefin-based polymer, an acryl-based polymer, a polyurethane-based polymer, an ether-based polymer, a polyester-based polymer, a polyamide-based polymer, a formaldehyde-based polymer, a silicon-based polymer and a copolymer comprising one or more monomers of the foregoing polymers.

13. The carbon nanotube-polymer composite of claim 7, further comprising at least one material selected from the group consisting of an acid-treated carbon nanotube, a non-treated carbon nanotube and a metal nanoparticle.

14. The carbon nanotube-polymer composite of claim 13, wherein the acid-treated carbon nanotube comprises a carboxyl group on a surface thereof.

15. The carbon nanotube-polymer composite of claim 13, wherein the metal nanoparticle comprises at least one element selected from the group consisting of Cs, Mg, Ca, Sr, Sc, Ti, Zr, Nb, Ta, Cr, Mo, W, Mn, Fe, Ru, Co, Ir, Ni, Pd, Pt, Cu, Ag, Au, Zn, Cd, Al, Ga, In, Ti, Si, Ge, Sn, Pb, Sb and Te.

16. The carbon nanotube-polymer composite of claim 7, further comprising at least one material selected from the group consisting of a solvent, a coupling agent, a dye, a filler, a flame retardant and a wetting agent.

17. A method of manufacturing a carbon nanotube-polymer composite, the method comprising:

providing a dispersible carbon nanotube comprising a carbon nanotube backbone and an organic moiety covalently bonded to the carbon nanotube backbone wherein the organic moiety is represented by Formula 1:

  Formula 1 wherein

* represents a point of attachment to the carbon nanotube backbone, wherein each L is independently selected from the group consisting of $-(CR_1R_2)_a-$, $-O-$, $-NR_3-$, and

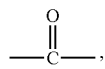

with the proviso that

if present is bonded to another L selected from the group consisting of $-O-$, $-NH-$, and $-(CR_4R_5)_a-$; and wherein Ar is a $C_6$ to $C_{14}$ aromatic group; n is 1 to 13; a is 1 to 20; $R_1$ and $R_2$ are each independently selected from the group consisting of hydrogen, a hydroxyl group, a cyano group, a halogen atom and $-NH_2$, $R_3$ is hydrogen or a $C_1$ to $C_{10}$ alkyl group; $R_4$ is $-H$ or $-NH_2$; and $R_5$ is $-H$.

18. The method of claim 17, wherein the providing of the dispersible carbon nanotube comprises acid-treating a non-treated carbon nanotube, and wherein the acid-treating of the non-treated carbon nanotube comprises contacting the non-treated carbon nanotube with at least one acid selected from the group consisting of nitric acid, hydrochloric acid and sulphuric acid.

19. The method of claim 17, wherein the providing of the dispersible carbon nanotube comprises acid-treating a non-treated carbon nanotube and mixing the acid-treated carbon nanotube with a compound represented by Formulas 3a, 3b, 3c, or 3d:

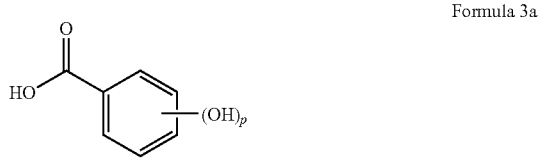

Formula 3a

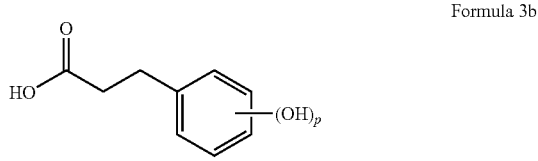

Formula 3b

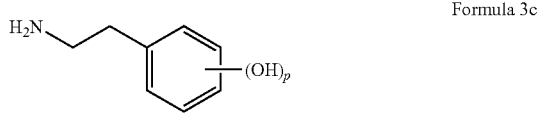

Formula 3c

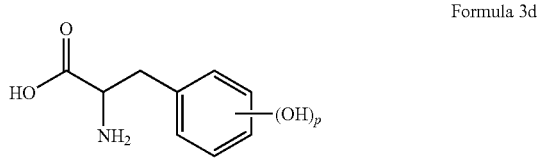

Formula 3d wherein p is 1 to 5.

* * * * *